(12) United States Patent
Stare

(10) Patent No.: US 7,496,821 B2
(45) Date of Patent: Feb. 24, 2009

(54) DATA TRANSMISSION SYSTEM

(75) Inventor: Erik Stare, Sollentuna (SE)

(73) Assignee: TB Invent AB, Sollentuna (SE)

( * ) Notice: Subject to any disclaimer, the term of this patent is extended or adjusted under 35 U.S.C. 154(b) by 509 days.

(21) Appl. No.: 11/232,995

(22) Filed: Sep. 23, 2005

(65) Prior Publication Data

US 2007/0186133 A1    Aug. 9, 2007

Related U.S. Application Data

(63) Continuation of application No. PCT/SE2004/000462, filed on Mar. 25, 2004.

(30) Foreign Application Priority Data

Mar. 25, 2003  (SE) .................................... 0300832

(51) Int. Cl.
*H03M 13/00* (2006.01)
(52) U.S. Cl. .................................... 714/751
(58) Field of Classification Search ......... 714/751–752, 714/758, 784; 375/346
See application file for complete search history.

(56) References Cited

U.S. PATENT DOCUMENTS

| 5,428,629 | A | * | 6/1995 | Gutman et al. | .............. | 714/758 |
| 7,227,917 | B2 | * | 6/2007 | Auranen | .................... | 375/346 |
| 2002/0181581 | A1 | | 12/2002 | Birru et al. | | |
| 2005/0013274 | A1 | * | 1/2005 | Pekonen et al. | ............. | 370/329 |

FOREIGN PATENT DOCUMENTS

| EP | 1 014 730 A1 | 6/2000 |
| EP | 1 253 721 A2 | 10/2002 |
| WO | WO-02/101946 A1 | 12/2002 |

OTHER PUBLICATIONS

Ahmavaara, K. et al., In: XVIII World Telecommunications Congress 2002 (WCT), Paris, France. Sep. 22-27, 2002.

* cited by examiner

*Primary Examiner*—Shelly A Chase
(74) *Attorney, Agent, or Firm*—Birch, Stewart, Kolasch & Birch, LLP

(57) ABSTRACT

A Digital Video Broadcasting system comprises a service provider generating first digitally coded information; a broadcast network provider receiving the first digitally coded information, said broadcast network provider includes a protocol stack having an MPEG2 TS layer below an IP layer; and encapsulates digitally coded information into MPEG-2 TS packages, and an FEC layer between the IP layer and the MPEG-2 TS layer. The broadcast network provider calculates FEC parity information and generates second digitally coded information comprising the first digitally coded information and the FEC parity information; and including an application data table containing IP datagrams that are extractable without use of said FEC parity information. The receiving unit extracts FEC parity information from the received digitally coded information. Detection of a unit of information that may contain erroneous information so that it is non-identical to the first digitally coded information is thereby effected.

43 Claims, 9 Drawing Sheets

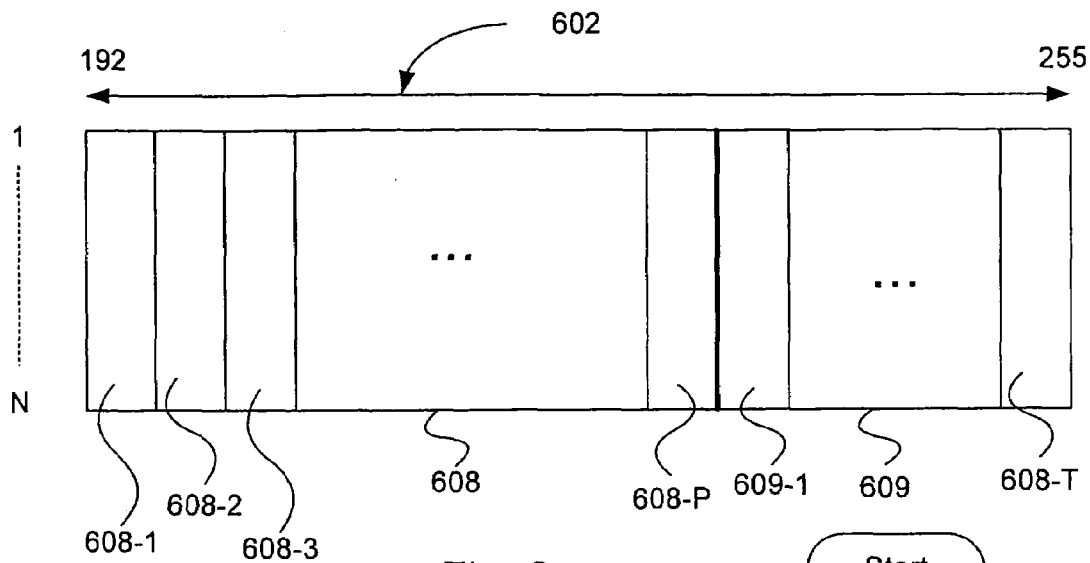
Fig. 6c
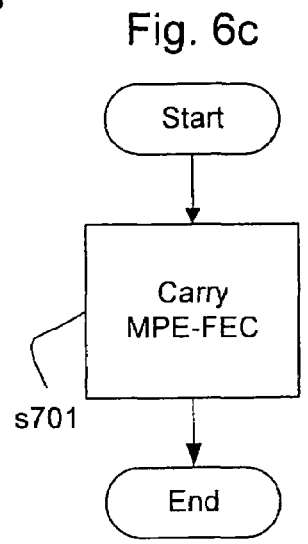
Fig. 7c
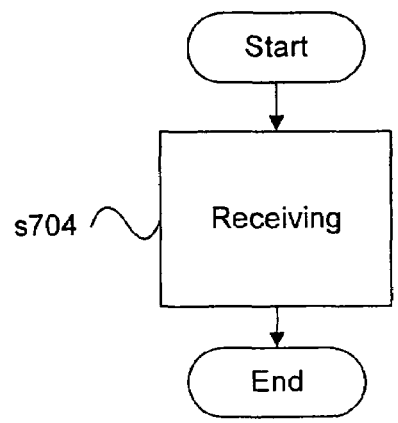
Fig. 7a
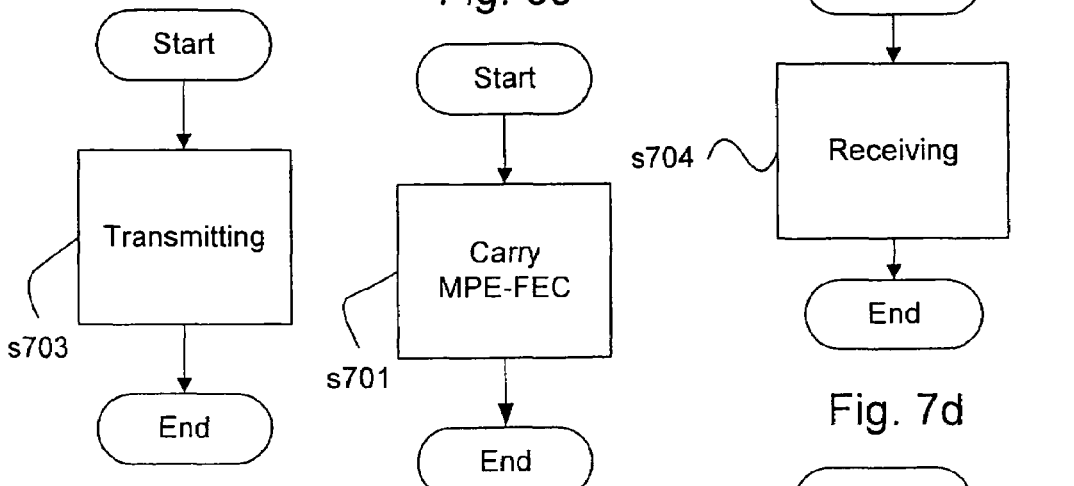
Fig. 7d
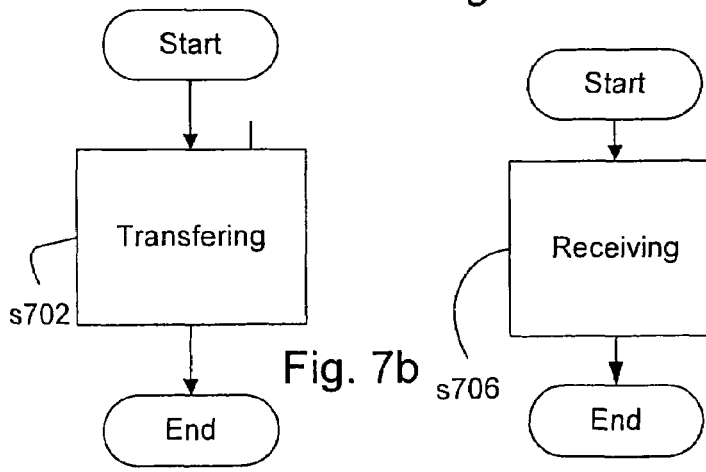
Fig. 7b
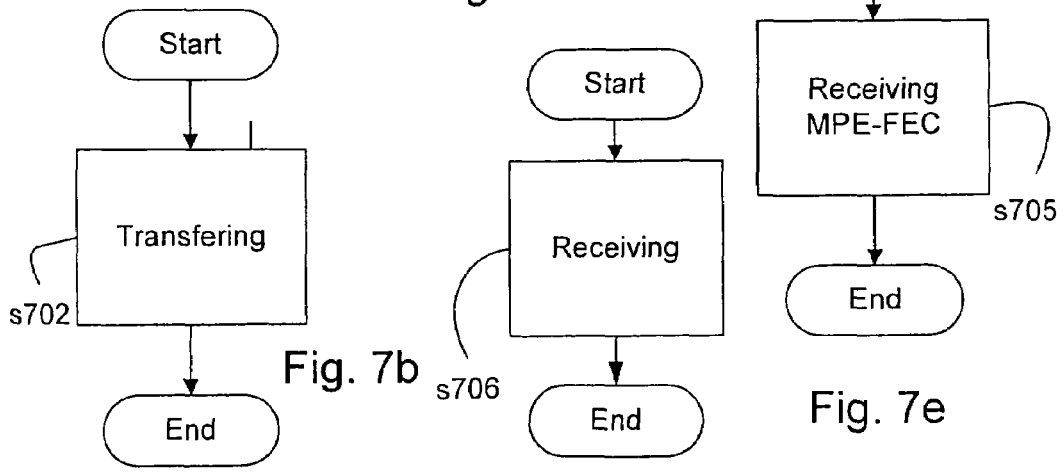
Fig. 7f
Fig. 7e

DATA TRANSMISSION SYSTEM

FIELD OF INVENTION

The present invention relates to a method for broadcasting, and in particular transmission in a DVB system. The invention also relates to a broadcast network provider and a receiving unit in a DVB system.

BACKGROUND OF THE INVENTION

Broadcasting may be performed in DVB (Digital Video Broadcasting) systems between a broadcast network provider and a user of the system via a satellite, terrestrial or cable networks. Transmissions in such systems are associated with errors of minor or significant importance.

In particular, in cases when the receiving terminal in a DVB broadcasting system is mobile, data transmission may be associated with significant errors in the transmitted data, which could significantly degrade the quality of service, or even make the service unusable.

DVB-T (Terrestrial), for example, is not designed for receiving data during movements, and is likely to be exposed for transmission errors in such conditions, especially at a high speed.

AHMAVAARA K et al.: "Broadcast and Multicast Services in Mobile Networks", Sep. 22-27, 2002, XVII World Telecommunication Congress 2002 (WTC 2002), Paris, France, SEE Congress Department discuss improvements of some DVB-T features important with mobile terminals. The document proposes that mobility enhancements relate at least to three things: Time slicing, Time interleaving and 4 k FFT mode. Further, the document states that multicast data will be distributed to multiple users, so that the quality of service cannot be associated to one terminal in particular. In IP Datacast service differentiation can be difficult to do based on quality of service as the IP route is the same for all services.

SUMMARY OF THE INVENTION

An aspect of the invention relates to the problem of improving performance of a DVB system while minimizing transaction costs for introducing such an improved DVB system.

According to an embodiment of the invention this problem is solved by a Digital Video Broadcasting system comprising
  a service provider for generating first digitally coded information; said digitally coded information being coded according to a first code;
  a broadcast network provider having an input for receiving said first digitally coded information, said broadcast network provider comprising a protocol stack having an MPEG2 TS layer below an IP layer; said broadcast network provider being arranged to encapsulate digitally coded information into MPEG-2 TS packages, and an FEC layer between said IP layer and said MPEG-2 TS layer, said broadcast network provider further comprising
    means for calculating FEC parity information dependent on said received first digitally coded information;
    means for generating second digitally coded information; said second digitally coded information comprising said first digitally coded information and said parity information; and
    an output for delivering said second digitally coded information; said second digitally coded information comprising an application data table containing IP datagrams and an RS data table, wherein said parity information is provided in said RS data table such that said IP datagrams are extractable without use of said FEC parity information;
  a relay arrangement for receiving said second digitally coded information and for relaying said second digitally coded information;
  a receiving unit for receiving digitally coded information; said receiving unit comprising a protocol stack having an MPEG-2 TS layer below an IP layer; and an FEC layer between said IP layer and said MPEG-2 TS layer; said receiving unit further comprising
    means for extracting FEC parity information from the received digitally coded information;
    means for extracting a unit of information corresponding to said first digitally coded information; wherein said unit of information may contain erroneous information so that said unit of information is non-identical to said first digitally coded information;

means for generating third digitally coded information in dependence on said unit of information and said extracted FEC parity information.

This solution advantageously enables the introduction of forward error correction of received information when a receiver with FEC functionality is used, without affecting the operation of a prior art receiver lacking such FEC functionality. Hence, the introduction of this solution does not cause any incompatibility problems. Thus, this solution may be implemented in a broadcast network with an existing population of receivers based on existing DVB specifications as standardised by ETSI.

According to another embodiment of the invention the above problem is solved by a broadcast network provider having an input for receiving said first digitally coded information, said broadcast network provider comprising a protocol stack having an MPEG-2 TS layer below a IP layer; said broadcast network provider being arranged to encapsulate digitally coded information into MPEG-2 TS packages, and an FEC layer between said IP layer and said MPEG-2 TS layer, said broadcast network provider further comprising
  means for calculating FEC parity information dependent on said received first digitally coded information;
  means for generating second digitally coded information; said second digitally coded information comprising said first digitally coded information and said parity information; and
  an output for delivering said second digitally coded information to a DVB transmitter for transmission of said second digitally coded information; said second digitally coded information comprising an application data table containing IP datagrams and an RS data table containing said parity information such that said IP datagrams are extractable without use of said FEC parity information.

This broadcast network provider advantageously enables the transmission of information with forward error correction coding so that forward error correction of received information is enabled when a receiver with FEC functionality is used, while allowing normal operation of a prior art receiver lacking such FEC functionality.

According to a preferred embodiment said DVB transmitter is a DVB-T transmitter.

According to another embodiment said DVB transmitter is a DVB-S transmitter.

The above identified problem is also solved by the provision of an RF-signal comprising second digitally coded information including an application data table comprising first digitally coded information containing IP datagrams; and an RS data table comprising FEC parity information such that said IP datagrams are extractable without use of said FEC parity information; said RF signal being a DVB signal.

This RF-signal advantageously enables the transmission of information with forward error correction coding so that forward error correction of received information is enabled when a receiver with FEC functionality is used, while allowing normal operation of a prior art receiver lacking such FEC functionality.

According to a preferred embodiment said RF-signal is a DVB-T signal.

According to another embodiment said RF-signal is a DVB-S signal.

The above identified problem is also solved by a receiving unit having an antenna for receiving an RF-signal comprising second digitally coded information including an application data table comprising first digitally coded information containing IP datagrams; and an RS data table comprising FEC parity information such that said IP datagrams are extractable without use of said FEC parity information; said RF signal being a DVB signal;

said receiving unit comprising a protocol stack having an MPEG2 TS layer below a IP layer; and an FEC layer between said IP layer and said MPEG-2 TS layer, said receiving unit further comprising means for extracting FEC parity information from the received digitally coded information;

means for extracting a unit of information corresponding to said first digitally coded information; wherein said unit of information may contain erroneous information so that said unit of information is non-identical to said first digitally coded information;

means for generating third digitally coded information in dependence on said unit of information and said extracted FEC parity information so that said third digitally coded information provides a corrected application data table having corrected digitally coded information.

This solution advantageously enables forward error correction of received information.

As mentioned above an aspect of the invention relates to the problem of improving performance of a DVB system while minimizing transaction costs for introducing such an improved DVB system.

This problem is also addressed by the solutions according to the present invention.

The present invention does not affect any incompatibility issues with any existing standards. The invention is fully compatible with DVB specifications as standardised by ETSI. Thus, the method is possible to implement in a broadcast network with an existing population of receivers based on existing DVB specifications as standardised by ETSI.

Seeing that the additional parity data is applied at the input side of the DVB system, a variety of additional options and services open for the operator of the system. One advantageous option is that the operator may provide different transmission qualities for different kind of services. Stock market data, for example, may be transmitted with a high transmission quality.

This solution effectively increases the performance of, for example, single antenna receiving units, such as mobile cellular phones equipped with a DVB receiver, by using a forward error correction code (FEC), which improves the correctness in the transmission via a DVB network system.

Since the method according to an aspect of the invention provides a robust transmission, less sensitive to interference, between a broadcast operator and a receiver, the method also provides higher frequency efficiency.

Some services, such as audio services, used in mobile handheld terminals may require relatively low bandwidth. Other types of services, as file downloading, may require significantly higher bandwidth. The present invention fulfils requirements for flexibility in DVB systems.

The invention, since the FEC mechanism is compatible with time slicing, beneficially provides positive synergy effects. Time slicing is a method in which data corresponding to a specific service are sent in bursts. In the receiver the bursts are buffered and the content can be presented to the user in a continuous flow. A receiver in a system using time slicing may, according to the method, be active a significantly shorter period of time. This means that less power is needed to operate the receiver.

Even further, time slicing may provide that a receiver in the system to listen in on neighbouring cells during the period of time between the bursts. A switching between two transmitters may be performed during said time period, which provides an improved hand over functionality of a mobile terminal.

Additional objects, advantages and novel features of the present invention will become apparent to those skilled in the art from the following details, as well as by practice of the invention. While the invention is described below, it should be understood that the invention is not limited to that. The above-mentioned skilled persons having access to the teachings herein will recognise additional applications, modifications and embodiments in other fields which are within the scope of the invention.

BRIEF DESCRIPTION OF THE DRAWINGS

For a more complete understanding of the present invention and further objects and advantages thereof, reference is now made to the following description of examples—as shown in the accompanying drawings, in which:

FIG. 6c shows in greater detail another part of the set of data according to an embodiment of the invention.

FIG. 7a schematically illustrates a method according to an embodiment of the invention.

FIG. 7b schematically illustrates a method according to an embodiment of the invention.

FIG. 7c schematically illustrates a method according to an embodiment of the invention.

FIG. 7d schematically illustrates a method according to an embodiment of the invention.

FIG. 7e schematically illustrates a method according to an embodiment of the invention.

FIG. 7f schematically illustrates a method according to an embodiment of the invention.

DETAILED DESCRIPTION OF THE DRAWINGS

Figure 1:
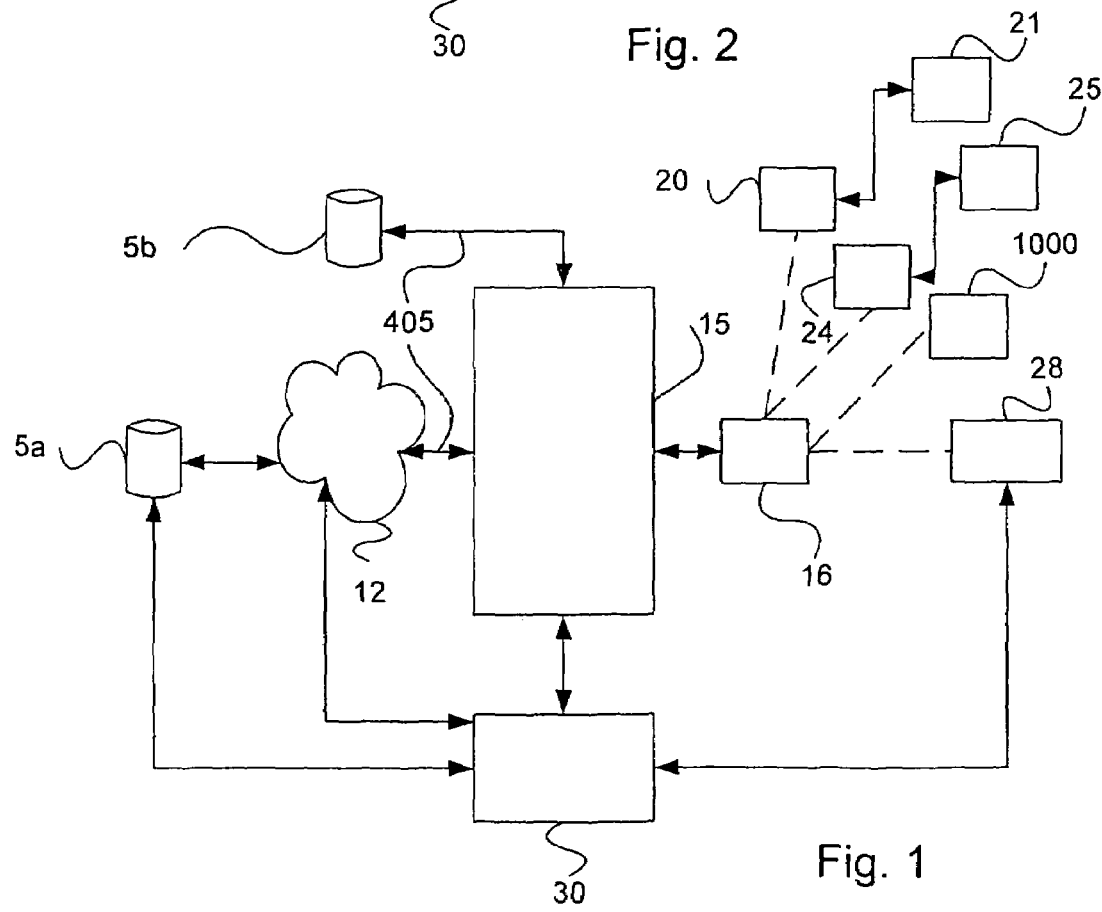
FIG. 1 illustrates an embodiment of a DVB system according to an aspect of the invention.

FIG. 1 schematically illustrates an embodiment of a service providing system, in particular suitable for DVB.

A service provider 5b is arranged to provide IP based services, such as for example streamed video and audio or web pages, to end users. Further, the services can be video clips, streaming TV- and radio programs, file download, games or other types of multimedia services.

The service provider 5b is adapted for communication with a broadcast network provider 15. The communication between the service provider 5b and the broadcast network provider 15 may be performed via a WAN link, such as for example, a fiber optic cable.

Alternatively, a service provider 5a is adapted for communication with the broadcast network provider 15 via a data communication network 12. The data communication network 12 may be the Internet.

The broadcast network provider 15 is arranged to encapsulate IP data, with or without FEC, into an MPEG-2 TS which is broadcast to end users over a DVB network.

According to one embodiment of the invention the broadcast network provider 15 is adapted for communication with a transmission network 16. The transmission network 16 may be a DVB network. The transmission network is adapted for communication with a mobile terminal 28. The mobile terminal 28 may be a mobile cellular phone, a PDA (Personal Digital Assistant), a hand held device, or other. The transmission network may also be adapted for communication with a TV 21 or a PC 25, via subscriber set top boxes 20 and 24, respectively. It should be noted that the invention also covers applications relating to receivers fixed at one location. It should be noted that the invention also covers applications relating to receivers, which are not in motion.

According to a preferred embodiment of the invention the transmission network is adapted for communication with a plurality of TV's, PC's and/or mobile terminals.

The transmission network is adapted for communication with a prior art receiver 1000. According to a preferred embodiment of the invention the transmission network is adapted for communication with a plurality of prior art receivers 1000.

According to a preferred embodiment of the invention the transmission network is adapted for communication with a plurality of TV's, PC's and/or mobile terminals and a plurality of prior art receivers 1000.

According to one embodiment of the invention the mobile terminal 28 is adapted for providing feedback to the system, e.g. to the broadcast network provider 15, the data communication network 12 or the service provider 5a, via a service 30. The service 30 may be GSM, GPRS, UMTS, or other.

Data transferred within the DVB-system according to the invention may also be referred to as messages.

Figure 2:
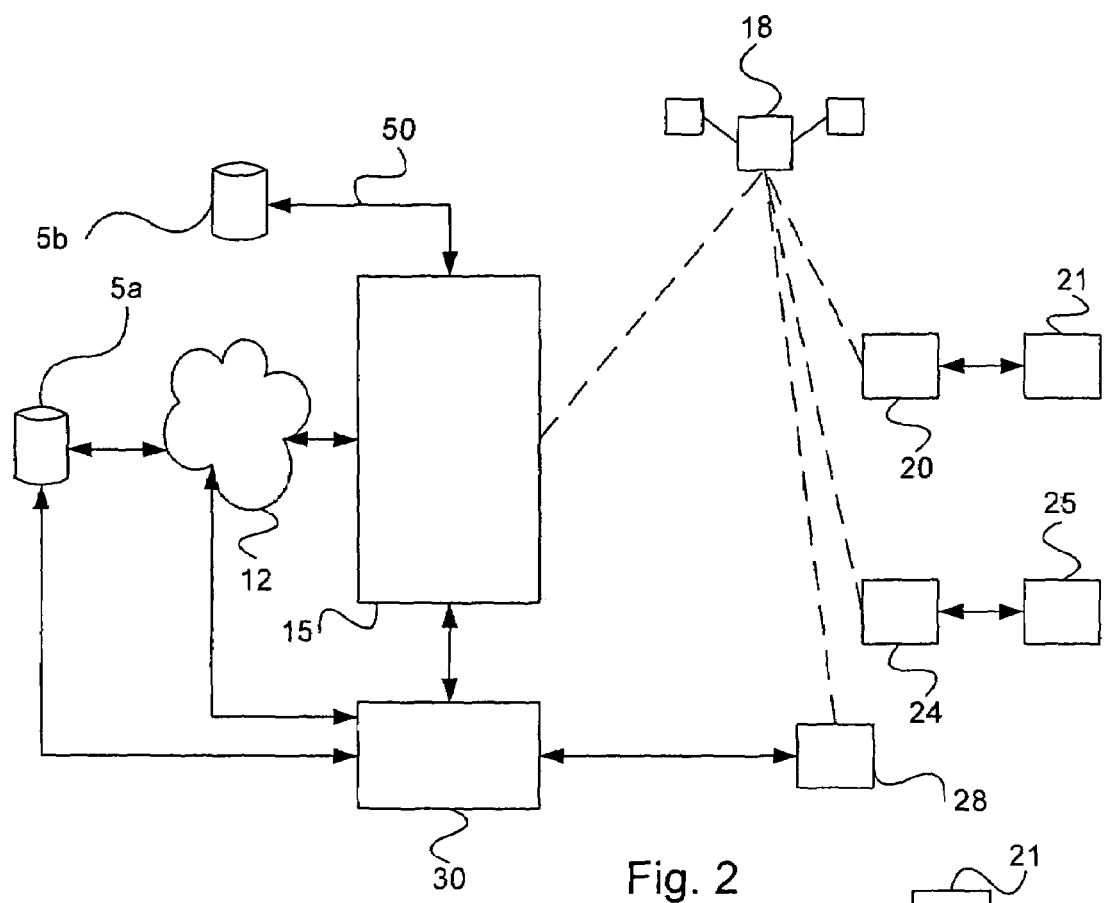
FIG. 2 illustrates yet an embodiment of a DVB system according to an aspect of the invention.

FIG. 2 schematically illustrates an embodiment, which is an alternative system of what is illustrated in FIG. 1.

The broadcast network provider 15 is adapted for communication with a satellite 18. The satellite 18 is adapted for communication with mobile terminal 28. The mobile terminal 28 may be a mobile cellular phone, a PDA (Personal Digital Assistant), a hand held device, or other. The satellite 18 is further adapted for communication with subscriber set top boxes 20 and 24. The subscriber set top boxes 20 and 24 are adapted for communication with a television (TV) and a personal computer (PC), respectively.

Figure 3:
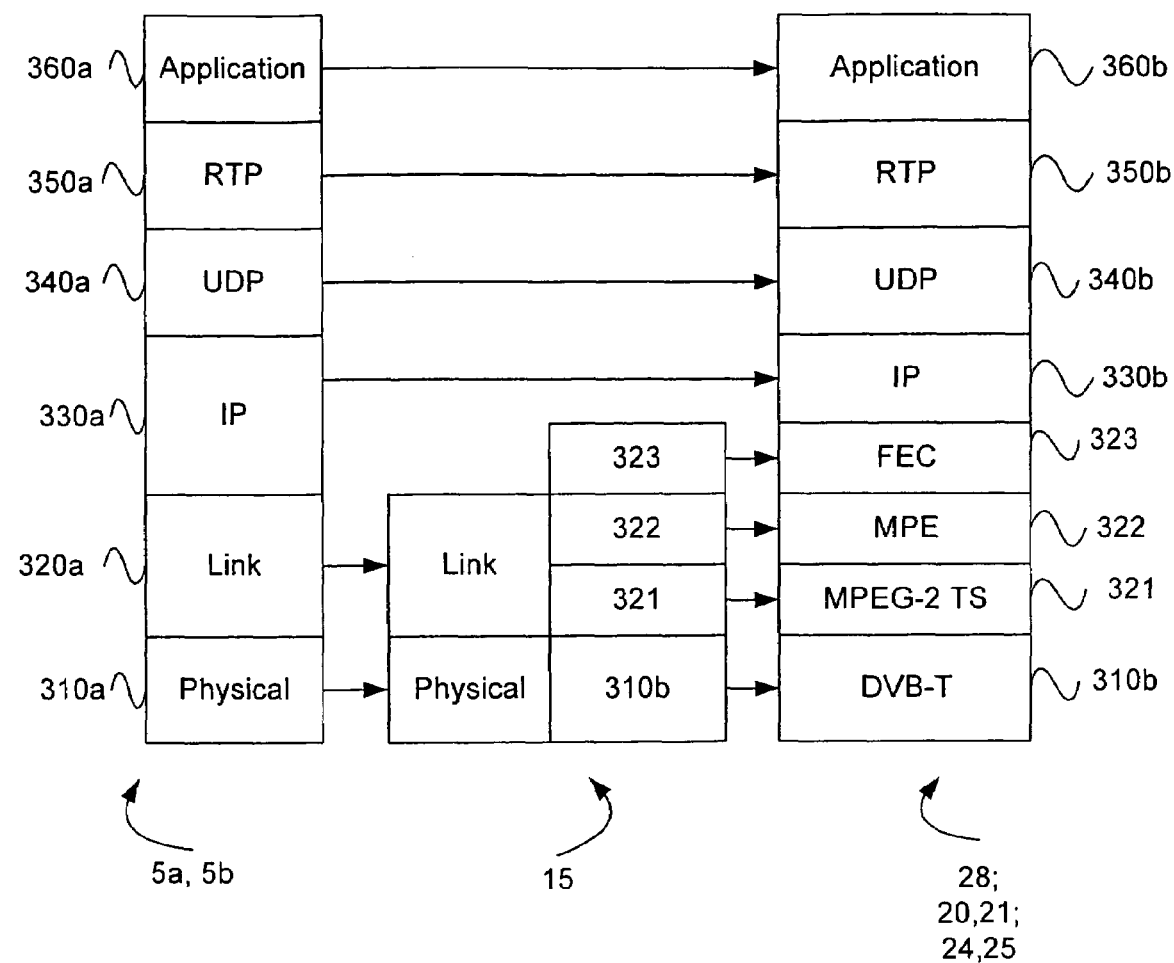
FIG. 3 illustrates an embodiment according to an aspect of the invention.

FIG. 3 illustrates a protocol stack, according to an embodiment of the invention, which protocol stack is used for communication between the service provider 5a and/or 5b, the broadcast network provider 15 and a mobile terminal 28 in a specific case, in which case the communication between the broadcast network provider and the mobile terminal is performed via a DVB-T network. Each layer uses the functionality of the underlying layers in accordance with the OSI model.

An application layer, comprising 360a and 360b, represents the transfer of application data from the service provider to the mobile terminal. The functionality of the application layer depends on the type of content that is transferred and the type of application software that is used in the mobile terminal to present the content to the user (e.g. software that presents audio and video).

A RTP layer, comprising 350a and 350b, represents the transfer of a synchronous stream of RTP packets from the service provider to the mobile terminal. The contents of RFC1889 is hereby incorporated by reference. RTP provides means to synchronise different content components (e.g. audio and video) to each other.

A UDP layer, comprising 340a and 340b, represents the transfer of UDP datagrams from the service provider to the mobile terminal, in accordance with RFC768, the contents of which hereby is incorporated by reference, UDP provides means for application software to send messages to other application software with a minimum of protocol mechanism.

An IP layer, comprising 330a and 330b, represents the transfer of IP datagrams from the service provider to the mobile terminal, in accordance with RFC791, the contents of which is hereby incorporated by reference. IP provides means to direct the data transfer to a specific single mobile terminal or a specific group of mobile terminals.

A link layer, comprising 320a, represents the transfer of link layer data from the service provider to the broadcast network provider. An example of link layer protocol is ATM (Asynchronous Transfer Mode).

A physical layer, comprising 310a, represents the physical transfer of data from the service provider to the broadcast network provider. An example of physical layer is optical fiber.

A FEC layer, comprising 323, represents the transfer of MPE-FEC frames (30a in FIG. 6a) from the broadcast network provider to the mobile terminal, in accordance with systems and methods further described and exemplified in FIGS. 4 and 5, 6a-c, 7a-e and 8a-c. The FEC layer provides means for the mobile terminal to recreate IP datagrams that might be lost in lower layers.

An MPE (Multi Protocol Encapsulation) layer, comprising 322, represents the transfer of MPE sections from the broadcast network provider to the mobile terminal, in accordance with the DVB data broadcasting standard, ETSI EN 301 192, the contents of which is hereby incorporated by reference. MPE is a higher link layer protocol typically used for transfer of IP data in DVB networks.

An MPEG-2 TS layer, comprising 321, represents the transfer of MPEG-2 TS packets from the broadcast network provider to the mobile terminal, in accordance with ISO/IEC 13818-1, the contents of which is hereby incorporated by reference. MPEG-2 TS is a lower link layer protocol used for transfer of data in DVB networks.

A DVB-T layer, comprising 310b, represents the transmission of the physical DVB-T signal from the broadcast network provider to the mobile terminal, in accordance with ETSI EN 300 744, the contents of which is hereby incorporated by reference.

Figure 4:
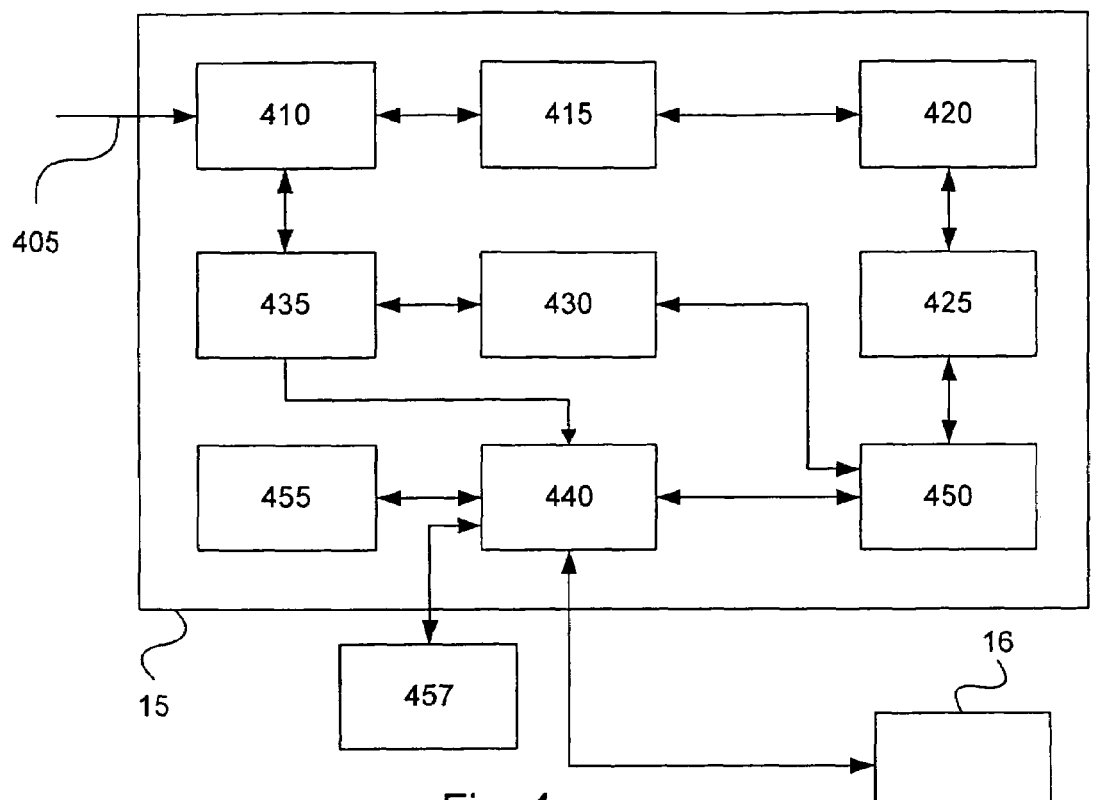
FIG. 4 illustrates a broadcast network provider according to an aspect of the invention.

FIG. 4 illustrates the broadcast network provider 15 in greater detail according to an embodiment of the invention.

IP data 405 sent from a service provider 5a and/or 5b, perhaps via the data communication network 12, is received in a read and write unit 410. The read and write unit 410 is arranged to write received IP data into the application data table 601. The read and write unit 410 is adapted for communication with means for adding padding 415 and second means for encapsulation 435.

The means for adding padding 415 is arranged for adding padding columns and padding bytes into the application data table 601. The means for adding padding 415 is adapted for communication with means for calculating parity 420. The means for calculating parity 420 is arranged for calculating parity information for each row and to write this information into the RS data table 602. The means for calculating parity 420 is adapted for communication with means for discarding puncturing columns 425.

The means for discarding puncturing columns 425 is arranged to discard puncturing columns. The means for discarding puncturing columns 425 is adapted for communication with first means for encapsulation 450. The means for encapsulation 450 is arranged to encapsulate remaining RS columns into FEC sections. The first means for encapsulation 450 is further arranged to receive RTPS data from a parameter generator 430 and add said data to the header of each FEC section. RTPS (Real Time Parameters Signaling) information contains information about the structure of the MPE-FEC-frame 30a, so that the receiver can reassemble the frame in an unambiguous way to ensure successful FEC-decoding of the data. An example of a parameter carried in each MPE-section is the start address of the IP datagram within the application data table. RTPS is carried in every packet since these parameters describe features of the FEC that could dynamically change between two consecutive MPE-FEC frames. The parameter generator 430 is adapted to communicate with both the first means for encapsulation 450 and the second means for encapsulation 435.

The parameter generator 430 is arranged to generate RTPS data and transmit this to both the first and second means for encapsulation 450 and 435, respectively.

The second means for encapsulation 435 is arranged to encapsulate IP diagrams received from read and write unit 410 into MPE sections. Further, the second encapsulation means 435 is arranged to receive RTPS data from the parameter generator 430 and add this data to the header of each MPE section. The second means for encapsulation 435 is adapted for communication with a multiplexer 440.

The multiplexer 440 is in this embodiment an MPEG-2 multiplexer, which is arranged to first transmit all MPE sections, and second send all the FEC sections. The multiplexer 440 transmits the MPE sections and the FEC sections to the transmission network 16, which in one embodiment of the invention may be a DVB-T transmitter.

The transmission network 16 is arranged to transmit the MPE and the FEC sections to, for example, the mobile terminal 28 (FIG. 1, 2). Preferably this is carried out using an RF signal. A service information generator 455 is adapted for communication with the multiplexer 440. The service information generator 455 is arranged to generate a time slice FEC identifier descriptor and send it to the multiplexer 440. As RTPS is used to signal dynamic features of the FEC, the time slice and FEC identifier descriptor is used to signal parameters related to more or less static features of the MPE-FEC frame. This includes for instance a parameter for signalling the amount of punctured RS columns and more importantly the number of rows N, in the MPE-FEC frame. The time slice and FEC identifier descriptor may be carried as a descriptor in DVB SI in accordance with the general framework of ETSI EN 300 468. The multiplexer 440 is arranged to receive said information and implement the same.

An operator of the broadcast network provider 15 may interact with the system by means of an interface 457. An operator of the broadcast network provider 15 may control the system by means of the interface 457.

Figure 5:
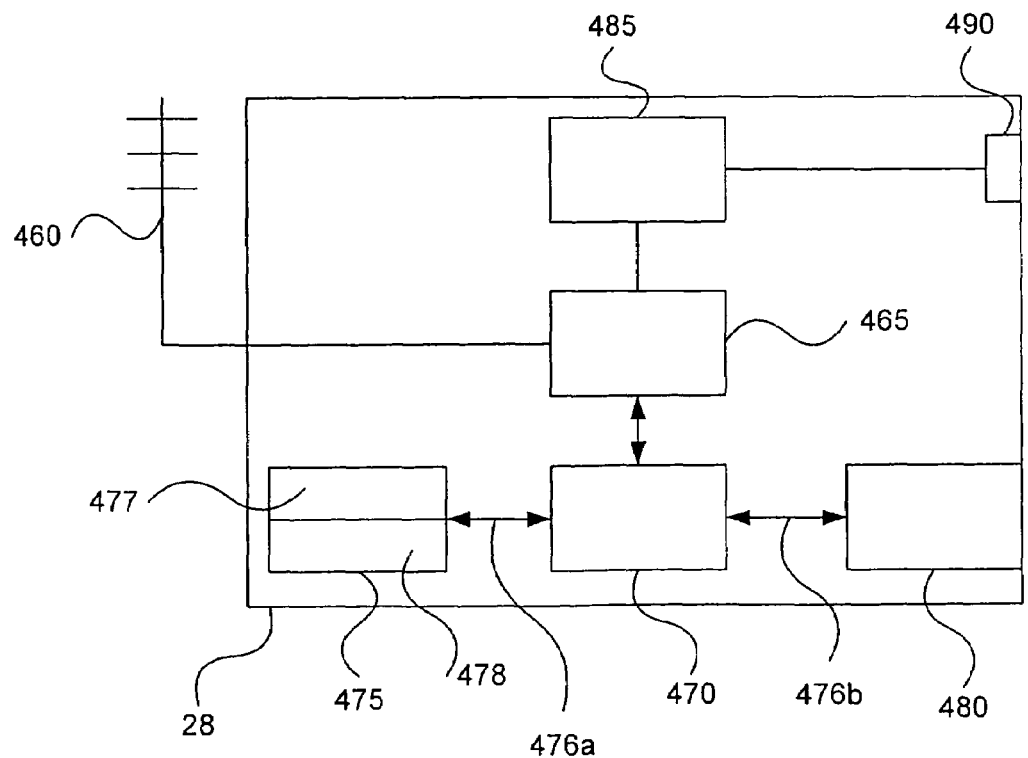
FIG. 5 illustrates a receiving unit according to an aspect of the invention.

FIG. 5 illustrates a mobile terminal according to an embodiment of the invention.

The mobile terminal 28 comprises an antenna 460 adapted for communication with for example the transmission network 16. Signals received by the antenna 460 are fed to a receiving unit 465. The receiving unit 465 comprises means for demultiplexing the incoming signals. The receiving unit 465 is adapted for communication with a processor unit 470.

The processor unit 470 may be a microprocessor. The processor unit 470 comprises means for decoding the demuliplexed signal according to the invention. The processor unit 470 is adapted for communication with a memory 475 via a data bus 476a.

The memory 475 comprises two memory parts. A first memory part 477 is a read/write memory. A second memory part 478 is a non-volatile memory. The processor unit 470 is adapted for communication with a user interface 480 via a data bus 476b.

The user interface may be a display, a keyboard, a touch-screen, a loud speaker, or else, or a combination thereof.

The mobile terminal 28 is powered by power supply means 485. The power supply means 485 may be a battery. The power supply means 485 is coupled to the receiving unit 465. The power supply means 485 may be powered by an external power source (not shown) via a power input means 490.

Figure 6A:
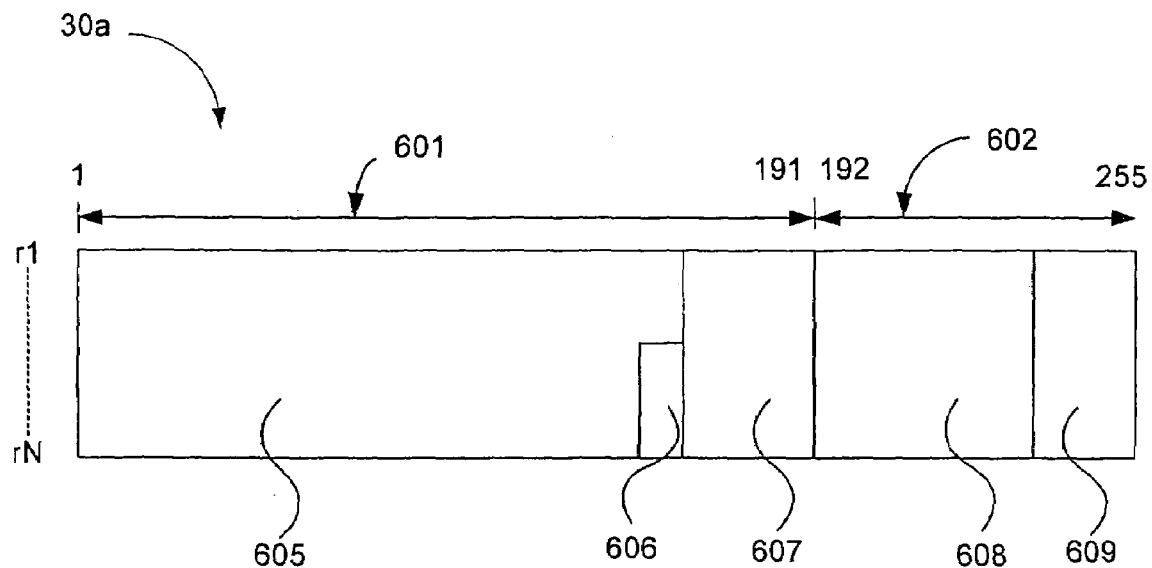
FIG. 6a schematically illustrates a set of data according to an aspect of the invention.

FIG. 6a schematically illustrates an MPE-FEC frame 30a according to one embodiment of the invention.

The MPE-FEC frame 30a may be arranged as a matrix with 255 columns and a flexible number N of rows. N is a positive integer. The number of rows N may vary dynamically from 1 to N in dependence of the time slice FEC identifier descriptor. One value for a maximum size is 1024, which makes the total MPE-FEC frame almost 2 Mbit large. Each position in the matrix hosts an information byte. A first part of the MPE-FEC frame, consisting of 191 columns, is dedicated for IP datagrams 605 and possible padding 606 and application padding 607. The first part is referred to as application data table 601. A second part of the MPE-FEC frame is referred to as RS data table 602. The second part, which consists of the remaining 64 columns, is dedicated for parity information of the FEC code. The second part comprises RS data 608 and punctured RS data 609.

Each byte position in the application data table 601 has an address ranging from 1 to 191 multiplied by N. Correspondingly, each byte position in the RS data table 602 has an address ranging from 1 to 64 multiplied by N.

Figure 6B:
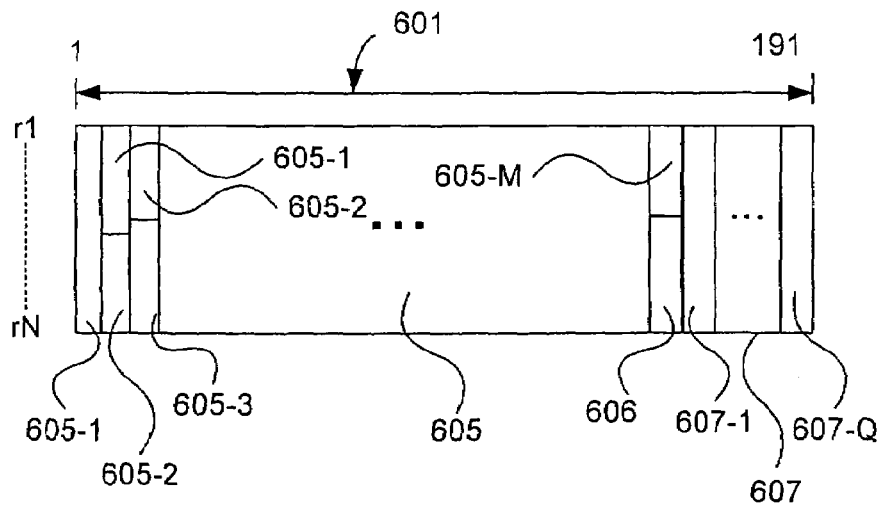
FIG. 6b shows in greater detail one part of the set of data according to an embodiment of the invention.

FIG. 6b shows in greater detail the application data table 601.

IP datagrams (1–M, M is a positive integer) are introduced datagram-by-datagram, starting with a first byte of a first datagram 605-1 in the first part of the application data table 601 and going downwards a first column. The size of the IP datagrams 605-1-605-M may vary arbitrarily and, thus, be mutually different. After the end of one IP datagram the following IP datagram starts. If an IP datagram does not end precisely at the end of a column, it continues at the top of the following column. When all IP datagrams have entered the application data table 601, unfilled byte positions are padded with zero bytes, which makes the application data table 601 completely filled.

Some columns in the application data table 601 may contain only padding used for code shortening. The exact number of such data padding columns is given by the time slice FEC identifier descriptor. The number of rows may be adjusted so that padding (not including data padding columns) is minimised. If provided, the application padding 607 may be divided in Q columns. Q is then a positive integer. If there is no application padding provided, Q is equal 0.

FIG. 6c shows in greater detail the RS data table 602. With all the 191 columns filled it is possible, for each row, to calculate 64 parity bytes from the 191 bytes (one byte from each column) of the IP datagrams and possible padding. The code used may be Reed-Solomon RS (255,191,64). Each row then contains one RS codeword. Some of the columns of the RS data table 602 may be discarded and hence not transmitted, enabling code puncturing. The number of punctured RS columns does not need to be explicitly signalled and may change dynamically between frames. With this also the RS data table is completely filled and the MPE-FEC frame 30a is completed. The RS data table 602 is divided in P columns containing RS data and, when puncturing is used, the remaining part of the RS data table is divided in T columns containing punctured RS data. T is then a positive integer.

FIG. 7a schematically illustrates a method according to an embodiment of the invention. The method starts, then performs the step s701, and thereafter ends.

IP datagrams are carried in MPE sections in the standard DVB way, irrespective of MPE-FEC being used or not. When MPE-FEC is used, RTPS are signalled using available MAC address bytes in the MPE header. The content of the DVB broadcasting standard, ETSI EN 301192, is hereby incorporated by reference. Advantageously, this provides reception fully backwards compatible with MPE-FEC ignorant receivers. RS data is carried in sections (MPE sections or other sections), which are compliant to the DSM-CC section format for private data. The content of, ISO/IEC 13818-6 is hereby incorporated by reference. These sections are hereafter referred to as FEC sections. In case of MPE sections, real time parameters are signalled using available bytes in the MPE header. In case other sections than MPE sections are being used, real-time parameters are signalled in the sections header.

Backwards compatible herein means compatible with previous versions of receivers, (MPE-FEC ignorant receivers), also referred to as prior art receivers.

Each section carries a start address for a IP datagram, which is carried within the section. This start address indicates the byte position in the application data table 601 of the first byte of the IP datagram and is signalled in a MPE header.

The receiving unit 465 will then be able to put the received IP datagram in the right byte positions in the application data table 601 and mark these positions as "reliable" for the RS decoder, provided a CRC-32 check shows that the section is correct.

One part, preferably the last, of the application data table 601 contains a table boundary flag, which indicates the end of the IP datagrams within the application data table 601. If all previous sections within the application data table 601 have been received correctly the receiver does not need to receive any FEC sections and can, if time slicing is used, be deactivated without receiving and decoding RS data 608.

If also FEC sections are received, the exact number of padding bytes (excluding padding columns 607) in the application data table 601 is indicated with 8 bits in the section header of the FEC sections, since it is only if RS decoding is performed that this value is needed. Since the number of rows is used to minimise padding the maximum number of such padding bytes is 190, since with more than 190 padding bytes the number of rows could be reduced to compensate for that. Eliminating N rows reduces padding with N×191 bytes. The procedure to adjust the number of rows does not take into account the padding columns.

FIG. 7b schematically illustrates a method according to an embodiment of the invention. The method starts, then performs the step s702, and thereafter ends.

The method for transferring IP-datagrams in a DVB system, comprising the steps of:
arranging said IP datagrams in application data tables;
generating parity data for each application data table in accordance with a FEC code;
arranging each application data table, together with the corresponding parity data, in an MPE-FEC frame;
generating real time parameters containing information about the structure of each MPE-FEC frame;
transmitting the IP datagrams in the DVB system, said IP datagrams being carried in dedicated MPE sections in compliance with the DVB data broadcasting standard, hereby the contents of ETSI EN 301 191 is incorporated by reference, for carrying IP data;
transmitting at least a part of the parity data in the DVB system, said parity data being carried in dedicated FEC sections in compliance with the DSM-CC section format, hereby the contents of ISO/IEC 13818-6 is incorporated by reference, for private data;
incorporating a subset of said real time parameters in the header of each MPE section, using available MAC address bytes in the MPE header according to the DVB data broadcasting standard;
optionally, incorporating a subset of said real time parameters in the header of each FEC section;
receiving at least a subset of said MPE sections and FEC sections;
extracting one or more IP datagrams from said MPE sections;
extracting parity data from said FEC sections;
extracting said real time parameters from said MPE sections;
arranging said IP datagrams and said parity data into MPE FEC frames, in dependance of said real time parameters;
recreating lost or corrupted IP datagrams in each MPE FEC frame, in accordance with said FEC code;
delivering said recreated IP datagrams to an output.
Preferably the method further comprising the step of:
recreating lost or corrupted IP datagrams is performed only if the step of extracting parity data is performed.

Preferably the step of recreating lost or corrupted IP datagrams is performed only if the step of extracting parity data is performed and otherwise said extracted IP-datagrams are delivered to said output.

Preferably the real time parameters comprising an address that describes the start position of the carried IP datagram within the application data table.

Preferably the real time parameters comprising a flag indicating whether or not the current MPE section is carrying the last IP datagram of an application data table.

Preferably the FEC code being the Reed-Salomon RS (255, 191,64).

FIG. 7c schematically illustrates a method according to an embodiment of the invention. The method starts, then performs the step s703, and thereafter ends. FIG. 7c schematically illustrates a method for transmitting IP-datagrams in a DVB system, the method comprising the steps of:

arranging said IP datagrams in application data tables;
generating parity data for each application data table in accordance with a FEC code;
arranging each application data table, together with the corresponding parity data, in an MPE-FEC frame;
generating real time parameters containing information about the structure of each MPE-FEC frame;
transmitting the IP datagrams in the DVB system, said IP datagrams being carried in dedicated MPE sections in compliance with the DVB data broadcasting standard;
transmitting at least a part of the parity data in the DVB system, said parity data being carried in dedicated FEC sections in compliance with the DSM-CC section format;
incorporating a subset of said real time parameters in a header of each MPE section and of each FEC section, using available MAC address bytes in the MPE header according to the DVB data broadcasting standard.

Preferably the real time parameters comprising an address that describes the start position of the carried IP diagram within the application data table.

Preferably the real time parameters comprising a flag indicating whether or not the current MPE section is carrying the last IP diagram of an application data table.

Preferably the FEC code being the Reed-Salomon RS (255, 191,64).

FIG. 7d schematically illustrates a method according to an embodiment of the invention. The method starts, then performs the step s704, and thereafter ends. FIG. 7d schematically illustrates a method for receiving IP datagrams within a DVB system, the method comprising the steps of:

receiving at least a subset of MPE sections and FEC sections;
extracting one or more IP datagrams from said MPE sections;
extracting parity data from said FEC sections;
extracting real time parameters from said MPE sections;
arranging said IP datagrams and said parity data into MPE FEC frames, in dependance of said real time parameters;
recreating lost or corrupted IP datagrams in each MPE FEC frame, in accordance with said FEC code;
delivering said recreated IP datagrams to an output.

Preferably the step of:
recreating lost or corrupted IP datagrams is performed only if the step of extracting parity data is performed.

Preferably the step of:
recreating lost or corrupted IP datagrams is performed only if the step of extracting parity data is performed and otherwise said extracted IP-datagrams are delivered to said output.

Preferably the real time parameters comprising an address that describes the start position of the carried IP diagram within the application data table.

Preferably the real time parameters comprising a flag indicating whether or not the current MPE section is carrying the last IP diagram of an application data table.

Preferably the FEC code being the Reed-Salomon RS (255, 191,64).

Preferably the method comprises the steps of, prior to the step of recreating lost or corrupted IP datagrams,
determining which of the received IP datagrams and parity bytes are considered reliable, and
using said reliability information as erasure information for the FEC code in the process of recreating lost or corrupted IP datagrams.

Preferably the method further is
performing a CRC-32 check on one or more of the MPE and FEC sections, and
using the result of the CRC-32 check to determine whether payload bytes of the section are considered reliable.

FIG. 7e schematically illustrates a method according to an embodiment of the invention. The method starts, then performs the step s705, and thereafter ends.

The number of rows in the MPE-FEC frame 30a can be determined from the section length of the FEC sections, since the payload of these sections is equal to the number of rows. This provides one section per column. The number of punctured RS columns 609 can be calculated as 64—last section number, since last section number indicates the number of sections and therefore number of columns.

The receiving unit 465 introduces the number of application data padding columns 607 with zero bytes, which is indicated by a time slice and FEC identifier descriptor, and marks these as reliable. The service information generator 455 may comprise the time slice FEC identifier descriptor. The receiving unit also introduces the number of punctured RS columns 609 as calculated from last section number. The actual data in the introduced punctured RS columns 609 are irrelevant as all punctured data is considered unreliable. Further, the receiving unit is able to introduce the number of padding bytes in the application data table 601, as indicated by the header of the FEC sections.

All MPE- and FEC sections are protected by a CRC-32 code, which reliably detects all erroneous sections. For every correctly received section belonging to the application data table 601, or to the RS data table 602, the receiving unit looks in the section header for the start address of the payload within the section, and is then able to put the payload in the right position the respective table.

After this procedure there are in general a number of remaining "holes", which corresponds to lost sections. All correctly received bytes, and application data padding, can then be marked as 'reliable' and all byte positions in the "holes", and in the punctured RS columns 609, can be marked as 'unreliable' in the RS decoding.

All byte positions within the MPE-FEC frame 30a are marked as either 'reliable' or 'unreliable'. With such reliability (erasure) information the RS decoder is able to correct twice the number of erroneous or unreliable bytes, which means the code can correct up to 64 such bytes per 255-byte codeword.

If there are more than 64 unreliable byte positions in a row the RS decoder may not be able to correct anything and will therefore typically just output the byte errors without error correction. The receiving unit may have knowledge about the positions of any remaining byte errors within the MPE-FEC frame 30a after RS decoding. If an IP datagram is only partly corrected the receiving unit may be able to detect this and (optionally) discard this datagram.

In addition to the CRC-32, which detects erroneous sections, A DVB-T RS decoder also very reliably detects erroneous TS packets. If a MPEG-2 demultiplexer discards erroneous packets it could be designed not to build sections, which contain lost TS packets. In this way only correct sections would be built and the CRC-32 would provide additional error detection functionality, which normally is not needed. It could however happen that the DVB-T RS decoder fails to detect an erroneous TS packet, which also happens to have the right. PID and construct an erroneous section. In these cases the CRC-32 would discover such a section error.

FIG. 7f schematically illustrates a method according to an embodiment of the invention. The method starts, then performs the step s706, and thereafter ends.

There is provided a method for receiving IP datagrams being transmitted in a DVB system together with parity data generated in accordance with a forward error correction (FEC) code, the IP datagrams and parity data being arranged in sequential MPE-FEC frames comprising the steps of:
- extracting one or more IP datagrams carried in MPE sections,
- determining if all IP diagrams belonging to a MPE-FEC frame have been received correctly, and
- deactivating further reception of some or all of the parity data until the next sequential MPE-FEC frame in dependence of said determination.

According to one embodiment the step of determining if all IP datagrams belonging to a MPE-FEC frame have been received correctly, comprising the steps of:
- extracting real time parameters containing information about the structure of the MPE-FEC frames, said real time parameters being incorporated in the header of each MPE section and comprising a flag indicating whether or not the current MPE sections is carrying the last IP datagram of the MPE-FEC frame to which it belongs, and
- determining if the last IP datagram and all previous IP datagrams belonging to the same MPE-FEC frame have been received correctly in dependence of said flag.

Figure 8A:
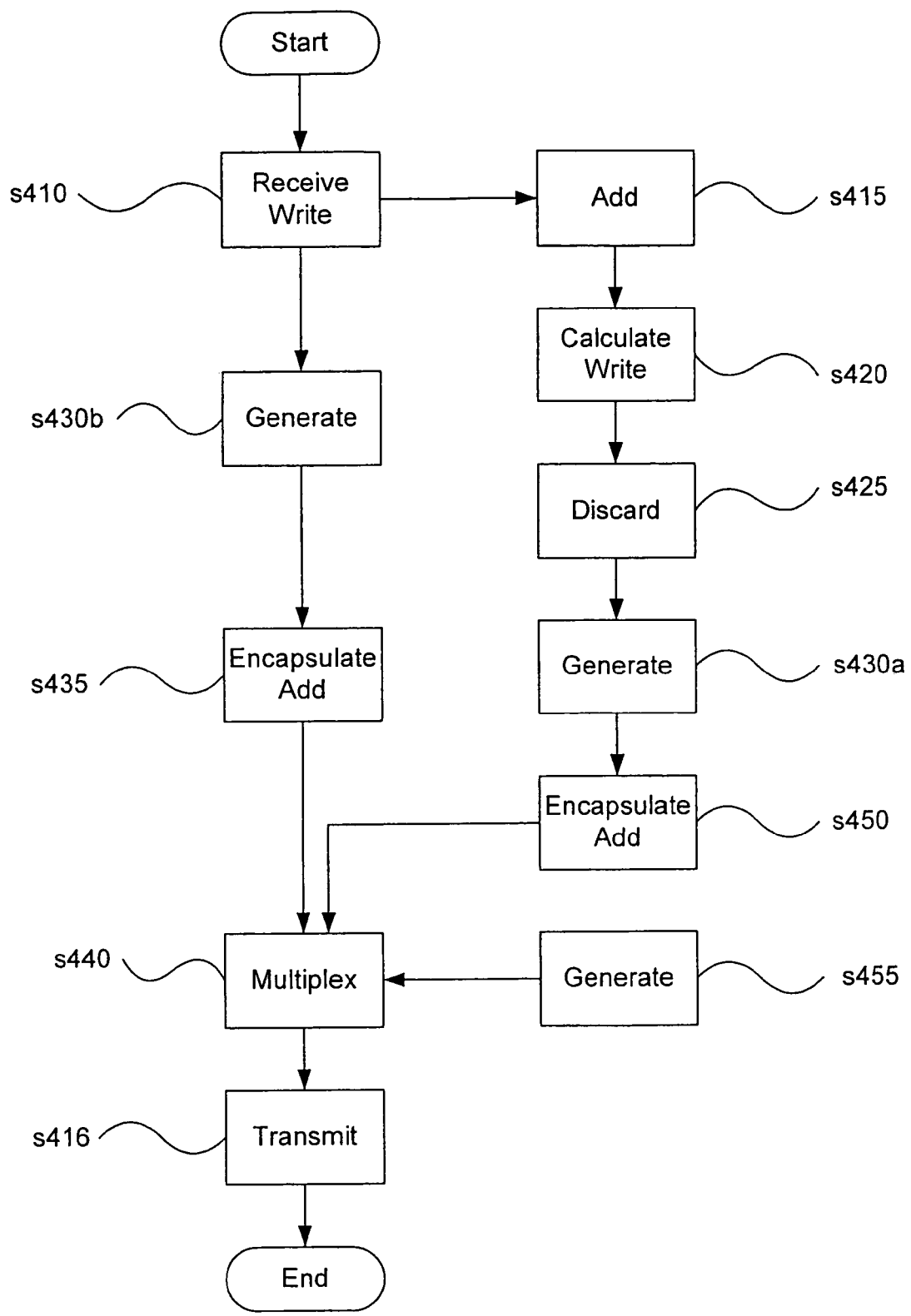
FIG. 8a illustrates in greater detail a method according to an embodiment of the invention.

FIG. 8a illustrates in greater detail a method according to an embodiment of the invention.

The method starts when IP data 405 sent from a service provider 5a and 5b, perhaps via the data communication network 12, is received in method step s410. The method step s410 also write received IP data into the application data table 601. The method divides in two parallel paths after the method step s410.

In a method step s415 of a first path padding is added into columns, also padding bytes are added into the application data table 601. In a next method step s420 parity is calculated for each row. The method step s420 also writes this information into the RS data table 602.

In a method step s425 puncturing columns are discarded.

A next method step s430a generates RTPS real time parameters.

In a next step remaining RS columns into FEC sections are encapsulated. Further, RTPS data is received and added to each section header in a FEC section.

In a second path a next method step s430b generates RTPS real time parameters. This is followed by a method step s435 in which the received IP diagrams are encapsulated into MPE sections. Further the RTPS data is received and added to each section header.

Output from the first and second flowchart path is used in a method step s440. This is a multiplexing step. The method step performs a first transmission of all MPE sections, and a second transmission of all the FEC sections.

The time slice FEC identifier descriptor is generated in a method step s455 and is further used as input in method step s440.

In a method step s416 a final transmission is performed. Here the MPE and the FEC sections are transmitted to, for example, the mobile terminal 28. Preferably this is carried out using a RF signal.

Figures 8B, 8C:
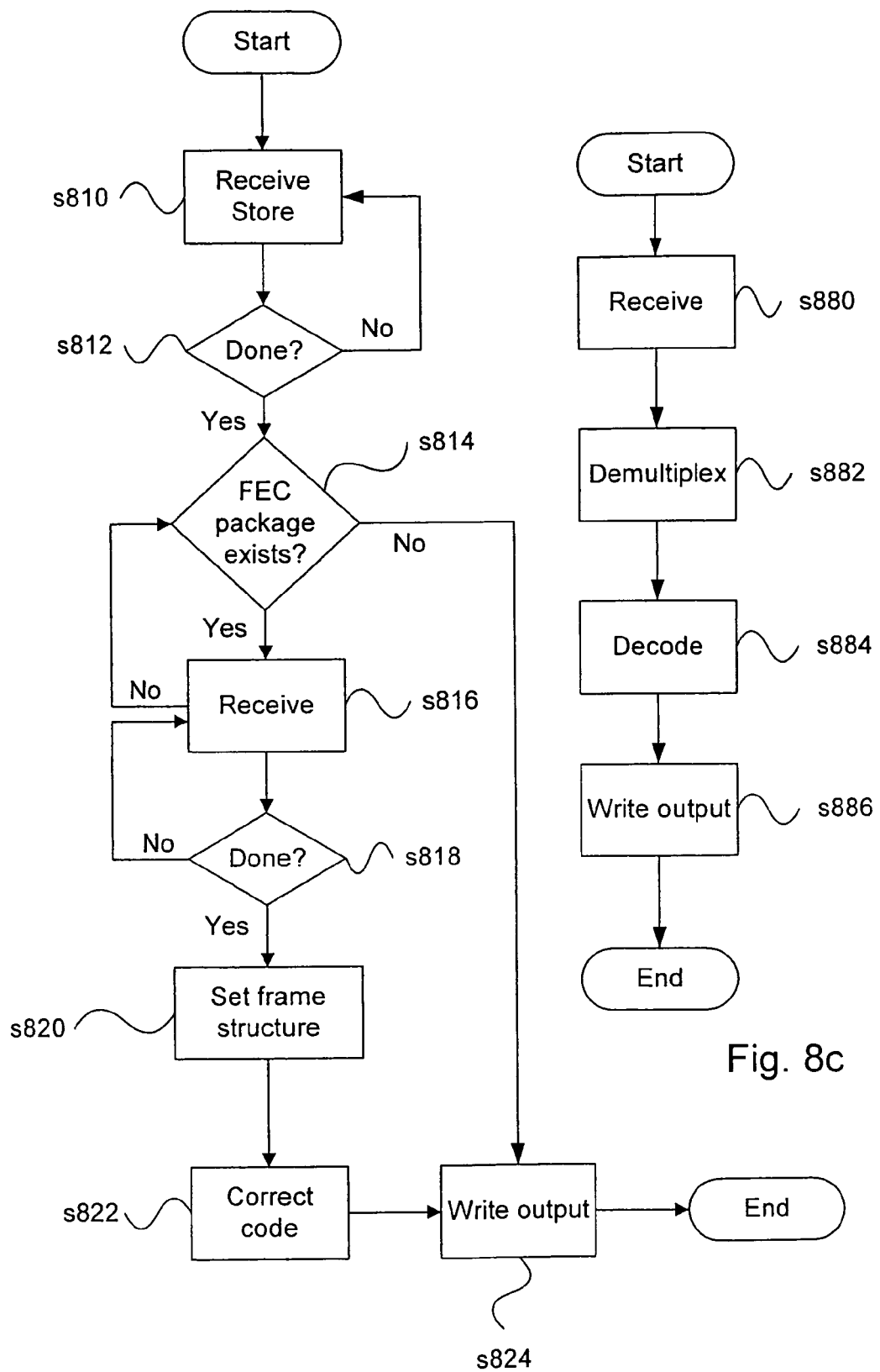
FIG. 8b illustrates in greater detail a method according to an embodiment of the invention.
FIG. 8c illustrates in greater detail a method according to an embodiment of the invention.

FIG. 8b illustrates in greater detail a method according to an embodiment of the invention.

A first method step s810 comprises the step of receiving a signal comprising one or more IP datagram and further store this IP datagram. The method step s810 also extracts RTPS data, which is stored. After that, a check s812, concerning if all IP datagram(s) are received, is performed. If not, a feedback loop to the method step s810 is performed. If yes, a method step s814 is checking if the signal comprises any FEC package. If not, a method step s824 is performed. If yes, a method step s816 is performed. The method step s816 comprises the step of receiving FEC packages and extracting RTPS data, which is stored, from the header of the FEC section carrying the FEC package. Next, a method step s818 is performed. The method step s818 performs a check whether all FEC packages are received. If not, a feedback loop to the method step s816 is performed. If yes, a method step s820 is performed. The method step s820 comprises the step of creating the MPE-FEC frame consisting of the IP datagrams previously received in step s810 and FEC packages previously received in step s810 and FEC packages previously received in step s816. The actual frame structure depends on the time slice and FEC identifier descriptor and the RTPS data previously stored in accordance with steps s810 and s816.

Next a method step s822 is performed. The method step s822 corrects errors in the IP datagrams in dependence of the received FEC packages. After the method step s822 a method step s824 is performed. The method step s824 writes the corrected IP datagrams as an output. Next the method ends.

FIG. 8c schematically illustrates a method according to an embodiment of the invention.

A first method step s880 is to receive a signal comprising IP datagrams and corresponding FEC packages. A next method step s882 is to demuliplex the signal. A next method step s884 is to decode the demultiplexed signal and correct the IP datagrams in dependence of said FEC packages. A next step s886 is to write the corrected IP datagrams as an output. Next the method ends.

Figure 9A:
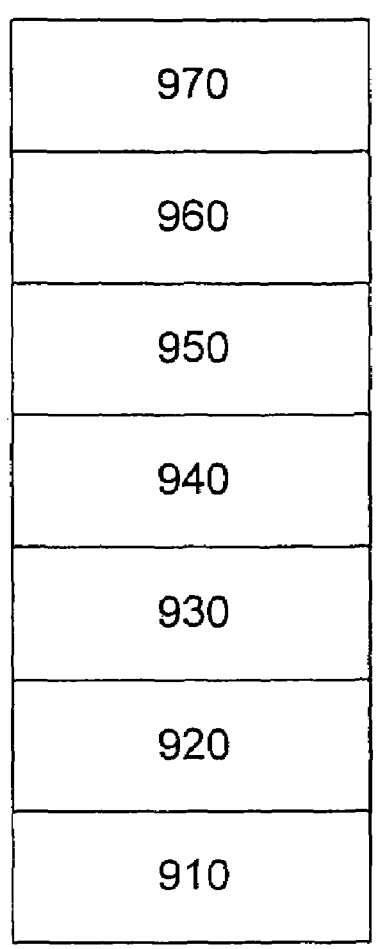
FIG. 9a schematically illustrates a protocol stack according to prior art.

FIG. 9a schematically illustrates a protocol stack 900a according to prior art. The protocol stack 900a shown in FIG. 9a has an application layer 970, an RTP layer 960, an UDP layer 950 and an IP layer 940, provided as shown in the figure, and are furthermore corresponding to the layers described with reference to FIG. 3, respectively. The protocol stack further include an MPE layer 930, an MPEG-2 TS layer 920 and a DVB layer 910. The MPE layer 930 is also referred to as section layer 930. The DVB layer can be DVB-T, hereby the contents of EN 300 744 is incorporated by reference, DVB-S or any other DVB physical layer. The layers 930, 920 and 910 are corresponding to the layers described with reference to FIG. 3, respectively.

Figure 9B:
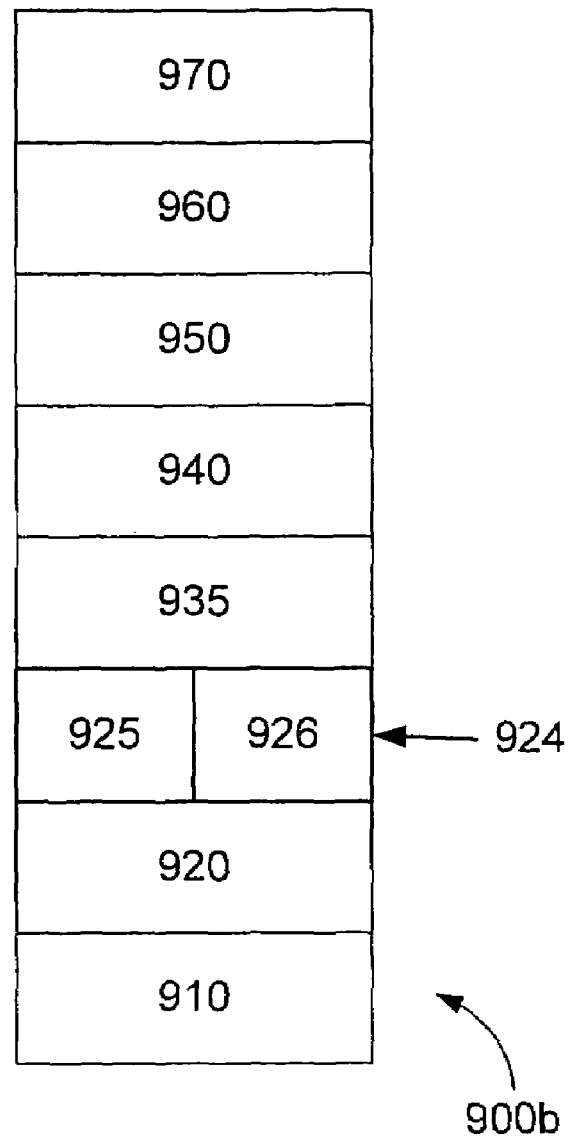
FIG. 9b schematically illustrates a protocol stack according to an embodiment of the invention.

FIG. 9b schematically illustrates a protocol stack 900b according to an embodiment of the invention. The protocol stack 900b shown in FIG. 9a has an application layer 970, an RTP layer 960, an UDP layer 950 and an IP layer 940, provided as shown in the figure, and are furthermore corresponding to the layers described with reference to FIG. 9a and FIG.

3. Under the IP layer 940 an FEC layer 935 is provided. The FEC layer 935 is also referred to as error correction layer. Under the FEC layer an MPE-FEC layer 924 is provided according to the invention. The MPE-FEC layer comprises an MPE part 925 comprising MPE sections. The MPE-FEC layer 924 comprises a FEC part 926 comprising FEC sections. The MPE-FEC layer is also referred to as section layer. The protocol stack further includes an MPEG-2 TS layer 920 and a DVB layer 910. The DVB layer can be DVB-T, DVB-S or any other DVB physical layer. The layers 920 and 910 are corresponding to the layers described with reference to FIG. 3, respectively.

FIG. 9a and FIG. 9b are illustrated by reasons of clarity. As is evident from the examples illustrated in FIGS. 9a and 9b, an extra error correction layer 935 is provided between the IP layer 940 and the MPEG-2 TS layer 920 in FIG. 9b. Furthermore, the section layer 930 is replaced by the section layer 924 in FIG. 9b, wherein the section layer 930 of FIG. 9a is a subset, thereby allowing receivers, built to receive IP datagrams transmitted according to FIG. 9a, also to receive IP datagrams transmitted according to FIG. 9b, although without benefiting from the additional error protection.

Figure 10:
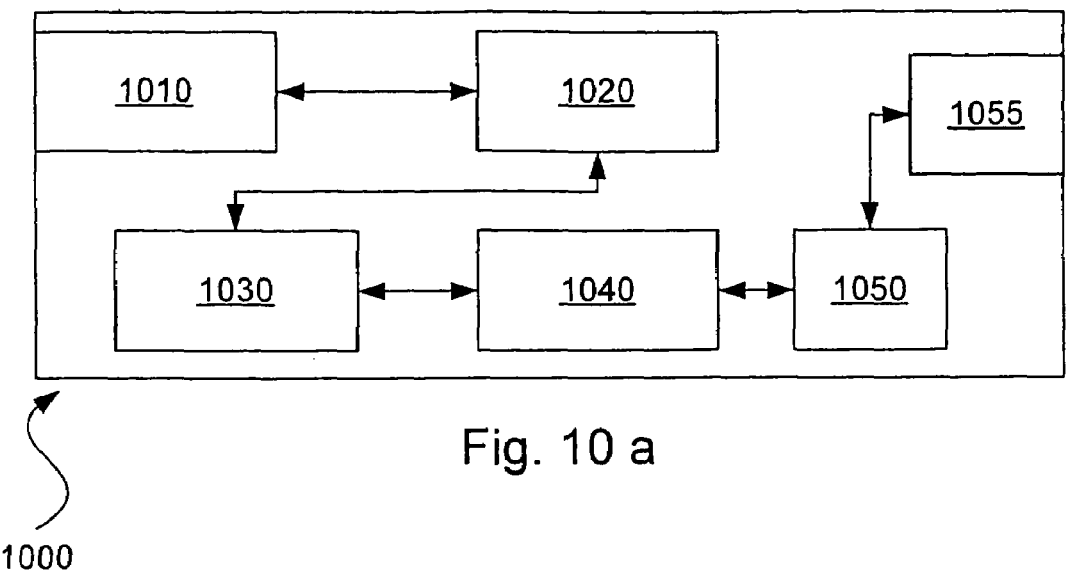
FIG. 10a schematically illustrates a receiving unit according to prior art.
FIG. 10b schematically illustrates a receiving unit according to an embodiment of the invention.
Figure 10:
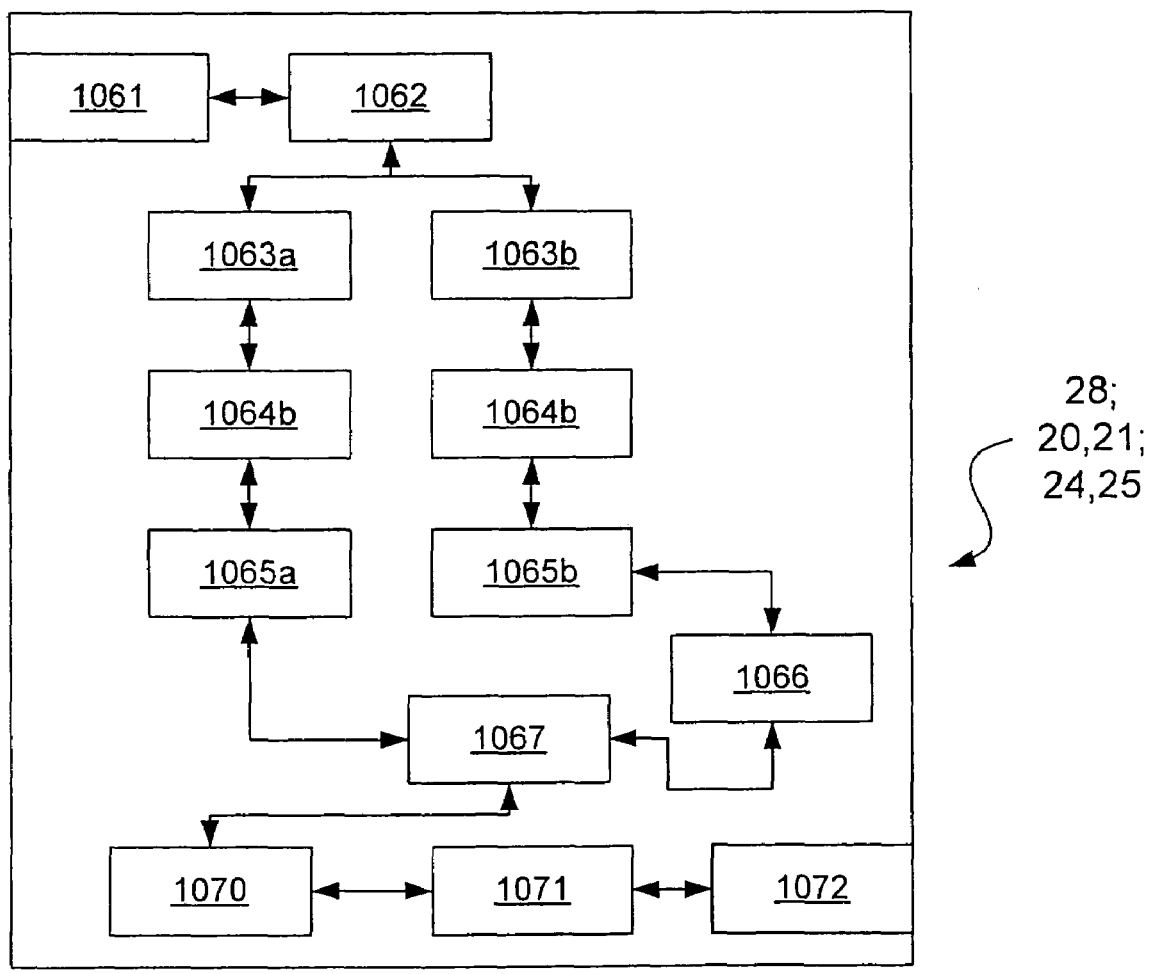

FIG. 10a schematically illustrates a receiving unit 1000 according to prior art. The receiving unit 1000 comprises receiving means 1010 adapted to receive a signal. Receiving means 1000 is adapted for communication with means for MPEG-2 demultiplexing 1020. The means for MPEG-2 demultiplexing is adapted for communication with means for reading service information 1030. The means for reading service information is adapted for communication with means for extracting MPE sections 1040. It should be clear that FEC sections here are not recognised. The means for extracting MPE sections 1040 is adapted for communication with means for decapsulating IP datagrams from MPE sections 1050. The means for decapsulating IP datagrams from MPE sections is adapted for communication with output means 1055. The output means is adapted to output IP datagrams.

FIG. 10b schematically illustrates a receiving unit according to an embodiment of the invention. The receiving unit 28, 20, 21, 24 or 25 comprises receiving means 1061 adapted to receive a signal. Receiving means 1061 is adapted for communication with means for preparation 1062, which means comprises means for MPEG-2 demultiplexing, means for reading service information and means for extracting MPE sections and FEC sections.

The preparation means is adapted for communication with means for checking 1063b. The means for checking 1063b is adapted to check CRC-32 of MPE sections. The means for checking 1063b is adapted to, for each MPE section, determine whether or not the MPE section contains any transmission errors by using the error detection capability of the CRC-32 code, which is applied to all MPE sections. If the result of the CRC-32 check is that the MPE section does not contain any errors, then the means reads RTPS. Otherwise, the section is rejected. This check is performed sequentially for all MPE sections according to an aspect of the invention.

The means for checking 1063b is adapted for communication with means for decapsulating 1064b. The means for decapsulating 1064b is adapted to decapsulate IP datagrams from MPE sections.

The means for decapsulating 1064b is adapted for communication with means for using RTPS information 1065b. The means for using RTPS information 1065b is adapted to use information of each MPE section to put corresponding IP datagram into the application data table.

The means for using 1065b is adapted for communication with means for adding 1066. The means for adding 1066 is adapted to add padding bytes and columns to the application data table. The means for adding 1066 is adapted for communication with means for marling 1067.

The means for preparation 1062 is further adapted to communication with means for checking 1063a. The means for checking 1063a is adapted to check CRC-32 of FEC sections. The means for checking 1063a is adapted to, for each FEC section, determine whether or not the FEC section contains any transmission errors by using the error detection capability of the CRC-32. If the result of the CRC-32 check is that the FEC section does not contain any errors, then the means reads RTPS. Otherwise, the section is rejected. This check is performed sequentially for all FEC sections according to an aspect of the invention.

The means for checking 1063a is adapted for communication with means for decapsulating 1064a. The means for decapsulating 1064a is adapted to decapsulate RS data from FEC sections.

The means for decapsulating 1064a is adapted for communication with means for using RTPS information 1065b. The means for using 1065b is adapted to use information of each FEC section to put corresponding RS data into the RS data table.

The means for using 1065b is adapted for communication with means for marking 1077.

The means for marking 1067 is adapted to mark all introduced data in MPE-FEC frame as "reliable". The means for marking 1067 is adapted to mark all remaining byte positions as "unreliable". The means for marking 1067 is adapted for communication with means for using 1070.

The means for using 1070 is adapted to use reliable information to perform erasure-based RS decoding on each row of the MPE-FEC frame. The means for using 1070 is adapted for communication with reading means 1071. The reading means 1071 is adapted to read IP datagrams from RS-corrected application data table. The means for reading is adapted for communication with output means 1072, which is adapted to output the IP datagrams.

According to an aspect of the invention there is provided an RF-signal comprising second digitally coded information including an application data table comprising first digitally coded information containing IP datagrams; and an RS data table comprising FEC parity information such that said IP datagrams are extractable without use of said FEC parity information; said RF signal being a DVB signal.

According to an aspect of the invention there is provided an RF-signal being a DVB-T signal.

According to an aspect of the invention there is provided an RF-signal being a DVB-S signal.

According to an aspect of the invention there is provided a receiving unit having an antenna for receiving the above described RF-signal comprising second digitally coded information including an application data table comprising first digitally coded information containing IP datagrams; and an RS data table comprising FEC parity information such that said IP datagrams are extractable without use of said FEC parity information; said RF signal being a DVB signal; said receiving unit comprising means for extracting a unit of information corresponding to said first digitally coded information; wherein said unit of information may contain erroneous information so that said unit of information is non-identical to said first digitally coded information;

means for extracting parity information from the received digitally coded information;

means for generating third digitally coded information in dependence on said unit of information and said extracted parity information, means for delivering said third digitally coded information to a user output interface; said third digitally coded information being substantially identical to said first digitally coded information;

According to another aspect of the invention there is provided a receiving unit having an antenna for receiving the above described RF-signal, said receiving unit comprising:

means for receiving at least a subset of MPE sections and FEC sections;

means for extracting one or more IP datagrams from said MPE sections;

means for extracting parity data from said FEC sections;

means for extracting real time parameters from said MPE sections;

means for arranging said IP datagrams and said parity data into MPE FEC frames, in dependence of said real time parameters;

means for recreating lost or corrupted IP datagrams in each MPE FEC frame, in accordance with said FEC code; and means for delivering said recreated IP datagrams to an output.

According to an aspect of the invention there is provided a broadcast network provider having an input for receiving first digitally coded information, said broadcast network provider comprising means for calculating parity information dependent on said received first digitally coded information;

means for generating second digitally coded information; said second digitally coded information comprising an MPE-FEC frame containing IP datagrams and parity data; and an output for delivering said second digitally coded information;

wherein said broadcast network provider is adapted to arrange said MPE-FEC frame such that said IP datagrams are extractable without use of said FEC parity information.

According to another aspect of the invention there is provided a broadcast network provider having an input for receiving first digitally coded information, said broadcast network provider comprising means for arranging said IP datagrams in application data tables;

means for generating parity data for each application data table in accordance with a FEC code;

means for arranging each application data table, together with the corresponding parity data, in an MPE-FEC frame;

means for generating real time parameters containing information about the structure of each MPE-FEC frame;

means for transmitting the IP datagrams in the DVB system, said IP datagrams being carried in dedicated MPE sections in compliance with the DVB data broadcasting standard;

means for transmitting at least a part of the parity data in a DVB system, said parity data being carried in dedicated FEC sections in compliance with the DSM-CC section format; and means for incorporating a subset of said real time parameters in the header of each MPE section, using available MAC address bytes in the MPE header according to the DVB data broadcasting standard.

According to another aspect of the invention there is provided a Digital Video Broadcasting system comprising a service provider for generating first digitally coded information; said digitally coded information being coded according to a first code;

a broadcast network provider having an input for receiving said first digitally coded information, said broadcast network provider comprising means for calculating parity information dependent on said received first digitally coded information;

means for generating second digitally coded information; said second digitally coded information comprising said first digitally coded information and said parity information; and an output for delivering said second digitally coded information;

a relay arrangement for receiving said second digitally coded information and for relaying said second digitally coded information;

a receiving unit for receiving digitally coded information; said receiving unit comprising means for extracting a unit of information corresponding to said first digitally coded information; wherein said unit of information may contain erroneous information so that said unit of information is non-identical to said first digitally coded information;

means for extracting parity information from the received digitally coded information;

means for generating third digitally coded information in dependence on said unit of information and said extracted parity information, means for delivering said third digitally coded information to an output; said third digitally coded information being substantially identical to said first digitally coded information;

wherein said second digitally coded information is arranged such that another receiving unit having a means for extracting said unit of information, but lacking said means for extracting parity information operates to deliver said unit of information to an output.

The invention claimed is:

1. A Digital Video Broadcasting system comprising
a broadcast network provider comprising:
means for calculating parity information dependent on first digitally coded information comprising IP datagrams;
means for generating second digitally coded information, said second digitally coded information comprising said first digitally coded information arranged in an application data table and said parity information arranged in a forward error correction coding data table; and
an output for delivering said second digitally coded information;
a relay arrangement for receiving said second digitally coded information and for relaying said second digitally coded information;
a receiving unit for receiving digitally coded information, said receiving unit comprising:
means for extracting parity information from the received digitally coded information;
means for extracting a unit of information corresponding to said first digitally coded information, wherein said unit of information may contain erroneous information so that said unit of information is non-identical to said first digitally coded information;

means for generating third digitally coded information in dependence on said unit of information and said extracted parity information; and a protocol stack comprising an IP layer being used for communication between the broadcast network provider and the receiving unit, and forward error correction being handled below said IP layer.

2. The Digital Video Broadcasting system according to claim 1, wherein the forward error correction coding data table is a RS data table containing parity data calculated using a Reed-Solomon code.

3. The Digital Video Broadcasting system according to claim 2, wherein the forward error correction is handled in a forward error correction layer of the protocol stack comprising the error layer, said forward error correction layer being located under the IP layer in the protocol stack.

4. The Digital Video Broadcasting system according to claim 2, wherein the means for generating second digitally coded information is arranged to introduce the IP datagrams in the application data table datagram-by-datagram, staffing with a first byte of a first datagram in the first part of the application data table and going down a first column; and the means for calculating parity information is arranged to calculate, for each row of the application data table parity information from the bytes of the IP datagrams of said row, including padding, if present.

5. The Digital Video Broadcasting system according to claim 4, wherein the broadcast network provider further comprises:

means for packing said IP datagrams in MPE (Multi Protocol Encapsulation) sections;

means for packing said parity information in FEC (Forward Error correction) sections, other than MPE sections;

means for generating RTPS (Real Time Parameter Signaling) data independence of the application data tables and the forward error correction coding, particularly RS, data tables;

means for adding a subset of the RTPS data to the header of each MPE section, using available MAC address bytes in the MPE header said subset of the RTPS data including a start address indicating the byte position in the application data table of the first byte of each IP datagram, allowing backwards compatibility reception of IP-based information, particularly IP datagrams.

6. The Digital Video Broadcasting system according to claim 5, wherein the RTPS data include a table boundary flag indicating the end of IP datagrams in an application data table.

7. The Digital Video Broadcasting system according to claim 3, wherein the forward error correction layer represents a transfer of MPE-FEC frames, a first part of said MPE-FEC frames comprising the application data table, a second part of said MPE-FEC frames comprising the RS data table.

8. The Digital Video Broadcasting system according to any one of claim 2, wherein the relay arrangement is a transmission network.

9. The Digital Video Broadcasting system according to claim 8, wherein said transmission network is a DVB-network, particularly a DVB-T network or a DVB-S network comprising a satellite adapted for communication with a mobile terminal.

10. The Digital Video Broadcasting according to claim 2, wherein the receiving unit further comprises means for delivering said third digitally coded information to an output, said third digitally coded information being substantially identical to said first digitally coded information, and said second digitally coded information is arranged such that another receiving unit having a means for extracting said unit of information, but lacking said means for extracting parity information, operates to deliver said unit of information to an output.

11. The Digital Video Broadcasting system according to claim 2, further comprising a service provider for generating said first digitally coded information, said digitally coded information being coded according to a first code.

12. The Digital Video Broadcasting system according to claim 2, wherein said second digitally coded information comprises an MPE-FEC frame containing said IP datagrams, and parity information, and said broadcast network provider comprises an output for delivering said second digitally coded information, and is adapted to arrange said MPE-FEC frame such that said IP datagrams are extractable without use of said parity information.

13. The Digital Video Broadcasting system according to claim 5, wherein the broadcast network provider further comprises:

means for generating the parity data for each application data table in accordance with an FEC code;

means for arranging each application data table, together with the corresponding parity data, in an MPE-FEC frame;

means for generating real time parameters containing information about the structure of each MPE-FEC frame;

means for transmitting the IP datagrams in the DVB system, said IP datagrams being carried in dedicated MPE sections;

means for transmitting at least a part of the parity data in a DVB system, said parity data being carried in dedicated FEC sections; and means for incorporating a subset of said real time parameters in the header of each MPE section and FEC section, using available MAC address bytes in the MPE header.

14. A broadcast network provider comprising:

means for calculating parity information dependent on first digitally coded information; comprising IP datagrams;

means for generating second digitally coded information, said second digitally coded information comprising said first digitally coded information arranged in an application data table and said parity information arranged in an forward error correction coding data table; and an output for delivering said second digitally coded information to a relay arrangement, forward error correction being handled below the IP layer of a protocol stack used for communication.

15. The broadcast network provider according to claim 14, wherein said forward error correction coding data table comprises an RS data table containing parity data calculated using a Reed-Solomon.

16. The broadcast network provider according to claim 14, wherein the forward error correction is handled in a forward error correction layer of the protocol stack comprising the IP layer, said forward error correction layer being located under the IP layer in the protocol stack.

17. The broadcast network provider according to claim 14, wherein the means for generating second digitally coded information is arranged to introduce the IP datagrams in the application data table datagram-by-datagram, starting with a first byte of a first datagram in the first part of the application data table and going down a first column, and wherein the means for calculating parity information is arranged to calculate, for each row of the application data table, parity information from the bytes of the IP datagrams of said row, including padding, if present.

18. The broadcast network provider according to claim 14, wherein said relay arrangement is a transmission network.

19. The broadcast network provider according to claim 18, wherein said transmission network is a DVB network, particularly a DVB-T network, or a DVB-S network comprising a satellite adapted for communication with a mobile terminal.

20. The broadcast network provider according to claim 17, wherein said first digitally coded information is packed in MPE sections.

21. The broadcast network provider at least according to claim 20, further comprising:
   means for generating RTPS data in dependence of the application data tables and the RS data tables; and
   means for adding a subset of the RTPS data to the header of each MPE section, using available MAC address bytes in the MPE header.

22. The broadcast network provider according to claim 21, wherein the RTPS data include start addresses indicating the byte position in the application data table of the first byte of each IP-datagram, allowing backwards compatibility reception of IP datagrams.

23. The broadcast network provider according to claim 22, wherein the RTPS data include a table boundary flag indicating the end of IP datagrams in an application data table.

24. The broadcast network provider according to claim 14, wherein said second digitally coded information comprises an MPE-FEC frame containing said IP datagrams, and parity information, said broadcast network provider comprising an output for delivering said second digitally coded information, and being adapted to arrange said MPE-FEC frame such that said IP datagrams are extractable without use of said parity information.

25. The broadcast network provider according to claim 20, wherein the broadcast network provider further comprises:
   means for generating the parity data for each application data table in accordance with an FEC code;
   means for arranging each application data table, together with the corresponding parity data, in an MPE-FEC frame;
   means for generating real lime parameters containing information about the structure of each MPE-FEC frame; means for transmitting the IP datagrams in the DVB system said IP datagrams being carried in dedicated MPE sections;
   means for transmitting at least a part of the parity data in a DVB system, said parity data being carried in dedicated FEC sections; and
   means for incorporating a subset of said real time parameters in the header of each MPE section and FEC section, using available MAC address bytes in the MPE header.

26. A receiving unit for receiving digitally coded information comprising first digitally coded information comprising IP datagrams arranged in application data table and parity information arranged in forward error correction coding data tables, said receiving unit comprising:
   means for extracting parity information from the received digitally coded information;
   means for extracting a unit of information corresponding to said first digitally coded information, wherein said unit of information may contain erroneous information so that said unit of information is non-identical to said first digitally coded information;
   means for generating third digitally coded information in dependence on said unit of information and said extracted parity information, said third digitally coded information being substantially identical to said first digitally code information, forward error correction being handled below the IP layer in a protocol stack used for communication.

27. The receiving unit according to claim 26, wherein the IP datagrams arranged in application data tables are arranged datagram-by-datagram, starting with a first byte of a first datagram in the first part of the application data table and going down a first column, and wherein the parity information arranged in forward error correction coding data tables is calculated, for each row of the application data table, from the bytes of the IP datagrams of said row, including padding, if present.

28. The receiving unit according to claim 27, wherein said first digitally coded information is packed in MPE sections.

29. The receiving unit according to claim 28, wherein said digitally coded information further comprises RTPS data, being carried in the headers of the MPE sections, using available MAC address bytes in said headers of the MPE sections; said receiving unit further comprises means for extracting said RTPS data.

30. The receiving unit according to claim 29, wherein the means for generating third digitally coded information further comprises means for arranging said unit of information in said application data table in dependence on said RTPS data.

31. The receiving unit according to claim 30, wherein the RTPS data include start addresses indicating the byte position in the application data tables of the first byte of each IP-datagram.

32. A method for transmission of first digitally coded information via a Digital Video Broadcasting system using a forward error correction code,
wherein said first digitally coded information comprises IP datagrams, the method comprising the steps of:
   writing the IP datagrams into an application data table;
   calculating parity information in dependence of the first digitally coded IP datagrams of the application data table;
   writing the parity information into an forward error correction coding data table;
   generating second digitally coded information comprising said first digitally coded information and said parity information,
   such that forward error correction can be handled by a layer in a protocol stack comprising an IP layer whereby said layer is below said IP layer.

33. The method according to claim 32, wherein the forward error correction (FEC) coding data table comprises an RS data table, and the generating step comprises:
   encapsulating IP datagrams into MPE sections;
   encapsulating a subset of the RS data table into FEC sections.

34. The method according to claim 33, further comprising the steps of:
- generating RTPS data in dependence of the application data table and the RS data table;
- adding a subset of the RTPS data of the header of each MPE section, using available MAC address bytes in the MPE header.

35. The method according to claim 34, wherein the RTPS data include start addresses indicating the byte position in the application data table of the first byte of each IP datagram.

36. The method according to claim 35, wherein the RTPS data include a table boundary flag indicating the end of IP datagrams in the application data table.

37. A method for receiving digitally coded information comprising first digitally coded information comprising IP datagrams in a Digital Video Broadcasting system (DVB) using a forward error correction code, comprising the steps of:
- extracting parity information dependent on said first digitally coded information and arranged in a forward error correction coding data table;
- extracting a unit of information corresponding to said first digitally coded information being arranged in an application data table, wherein said unit of information may contain erroneous information so that said unit of information is non-identical to said first digitally coded information;
- generating third digitally coded information in dependence on said unit of information and said extracted parity information, whereby forward error correction is handled below the IP layer of a protocol stack used for communication.

38. The method according to claim 37, wherein the forward error correction is performed in a forward error correction layer located below said IP layer.

39. The method according to claim 37, comprising the steps of:
- decapsulating and storing IP datagrams encapsulated in MPE sections in a layer below the IP layer in the protocol stack comprising an IP layer;
- decapsulating and storing parity information encapsulated in FEC sections in a layer below the IP layer in the protocol stack comprising an IP layer;
- extracting and storing RTPS data, carried in the header of each MPE section, using available MAC address bytes in the MPE header;
- using the RTPS to determine the structure of one or more MPE-FEC frames;
- arranging one or more received IP datagrams, together with received parity information, in one or more MPE-FEC frames in accordance with the determined structure of the MPE-FEC frames, and
- recreating lost or corrupted IP datagrams in the MPE-FEC frames in accordance with said FEC code.

40. The method according to claim 39, wherein the RTPS data include start addresses indicating the byte position in the application data table of the first byte of each IP datagram.

41. The method according to claim 37, wherein the FEC code is Reed-Solomon (RS).

42. The method according to claim 41, wherein the step of recreating lost or corrupted IP datagrams is performed only if the step of extracting parity information is performed.

43. The method according to claim 42, wherein
- the step of recreating lost or corrupted IP datagrams is performed only if the step of extracting parity information is performed, and
- if the step of extracting parity information is not performed, said extracted IP datagrams are delivered to an output.

* * * * *